May 9, 1967 J. SKOPEK 3,318,077
DEVICE FOR REMOVING WATER FROM THE STAGES OF STEAM TURBINES
Filed Oct. 16, 1963 3 Sheets-Sheet 3

INVENTOR.
Jan Škopek
BY

United States Patent Office 3,318,077
Patented May 9, 1967

3,318,077
DEVICE FOR REMOVING WATER FROM THE STAGES OF STEAM TURBINES
Jan Škopek, Dobrany, Czechoslovakia, assignor to Závody V.I. Lenina Plzeň, národní podnik, Plzen, Czechoslovakia
Filed Oct. 16, 1963, Ser. No. 316,767
1 Claim. (Cl. 55—447)

The invention relates to a device for, removing water from the stages of steam turbines in the region of wet steam.

Various types of draining devices have been in use with condensing steam turbines operating in the region of wet steam, for removing the water component from the wet working steam.

The main object of such draining devices is to reduce erosion of the moving blades and to reduce to a minimum deterioration of the thermodynamic efficiency of the stage under the braking effect of water. Such draining devices are generally characterized by a system of variously arranged peripheral and radial or axial channels or passages which are always arranged outside the space of the guide blades of the stage. The object of the said peripheral passages is to capture the water centrifuged from the moving blades. This water is then guided away outside the space of the stage by suitably arranged radial or axial passages.

There are two basic groups into which all hitherto used draining devices may be divided, namely:

(1) A first group includes devices which are based on the principle of separating water from steam by the effect of the centrifugal forces acting on the water drops captured by the moving blades.

(2) A second group into which belong devices in which in addition to centrifugal forces, water is separated from steam by directly drawing the wet steam which is rich with water from the peripheral zone into an area of a pressure lower than the pressure in the given stage, for example into the condenser.

Such draining devices are in common use in low-pressure stages of condensing steam turbines without heating-up or with heating-up the steam, without taking into account the power of the machine; also in turbines working with saturated or slightly superheated steam in nuclear power plants.

Besides the above mentioned arrangements before or after the rotor wheel or runner of the turbine stage, turbines working with saturated steam in a nuclear power plant use also grooved moving blades. The grooves are radial ones and they are arranged on the back of the moving blade which extends approximately to one-half of the length of the blade from its tip or head.

The devices of the above mentioned type are attended with the following drawbacks:

(1) Measurements carried out on turbines in operation or on experimental devices have proved that the efficiency of such draining devices is rather low, 20 to 30%. Even the arrangement of grooves in the moving blades has not led to a substantial increase in the amount of water taken away from the stage.

(2) As the centrifuged water flows from the moving blades through a radial passage between the moving blades of the preceding stage and the guide wheel of the subsequent stage, or the radial passage between the guide wheel and the moving blades of the same stage, the water is again drawn into the stream of working steam. From the point of view of erosion of the moving blades of the stage, this water is particularly dangerous because it has already formed larger drops.

(3) All known draining devices lead away the water particularly from the peripheral zone of the stage; but a considerable part of the water does not reach this peripheral region during the relatively short time in which the steam flows through the guide blades, and this water is carried by the steam into the moving blades.

(4) The known devices lead away from the given stage mainly water which has been carried into this stage by the working steam from the preceding stage but not the water which forms, on the one hand by expansion of the steam, and on the other hand, by steam condensation on the surface of the guide blades of the given stage.

(5) Whenever known draining devices use, for separation of the water component from water steam, centrifugal forces created by rotation of the moving blades, these devices separate the water from the steam only after the water has already reached the moving blades and has already affected the given stage with its two main injurious effects, namely: worse thermodynamic efficiency and erosion of the moving blades.

The said drawbacks are eliminated by the invention in that the water is led away from the wet steam directly on the surface of the guide blades where the water in the stage is mainly condensed due to heat transfer to the surface of the guide blade. The water is led away by a system of draining openings or slots of a suitable shape located in an outer surface of the guide blade, that is at a place where most of the water collects due to the centrifugal force proportional to the relative speed of the steam stream in the blade channel of the guide blade and the diameter of the curvature of the channel of the profile. The size and the position of the openings or slits in the blade are selected so as to secure maximum draining efficiency. Return streaming of the separated water into the stage is impossible in the new arrangement according to the invention because the water is led away by a system of openings or slots immediately outside the passage part of the turbine stage into the space of the cavity or hollow of the guide blade. The water is led away over the entire length and depth of the profile of the guide blade, whereby not only the water from the preceding stage, but also the water produced by steam expansion in the given stage is removed. Due to the fact that the water is led away almost over the entire length of the outlet edge of the guide blade, conditions are also created to lead away a considerable portion of the water film forming on the surface of the guide blade. The principle of operation of existing draining devices cannot insure that the water film, which in existing turbines is the main cause of erosion of the moving blades and of the deterioration of the thermodynamic efficiency of the stage, will be led away before entering the moving blades. Due to the fact that by leading away the water into the hollow space of the guide blade, its amount flowing through the guide passage will diminish, the so called indirect braking loss of the water will also diminish, this loss being caused by imparting the kinetic energy of the carrying medium, that is the steam, to the water, the latter flowing, due to greater viscosity and specific mass, at a smaller speed than the steam. The main advantage of the new method of draining turbine stages working in the region of wet steam resides in the fact that the water component is led away from the stage in the guide blades and not in the moving blades where the two main injurious effects of the water affect the work of the stage and the life of the moving blades, namely: deterioration of the thermodynamic efficiency of the stage and erosion of the blades.

The invention will be best understood from the following specification to be read in conjunction with the accompanying drawings, in which.

Figure 1:
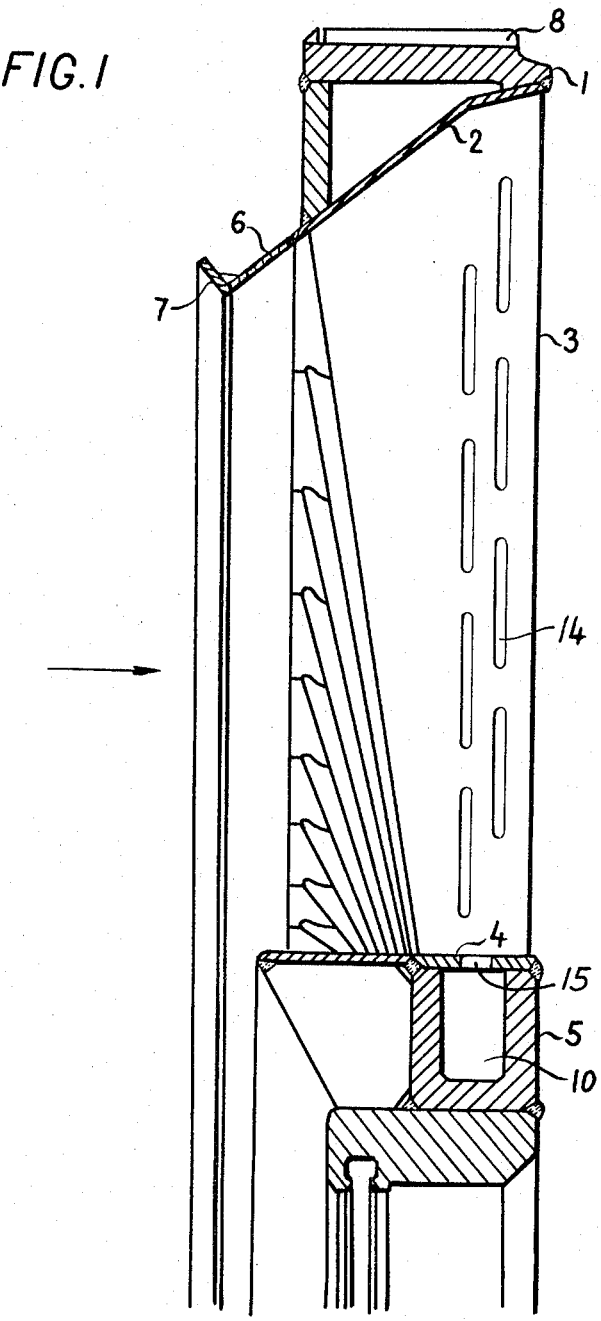
FIG. 1 illustrates the upper part of a guide wheel in axial section.
Figure 2:
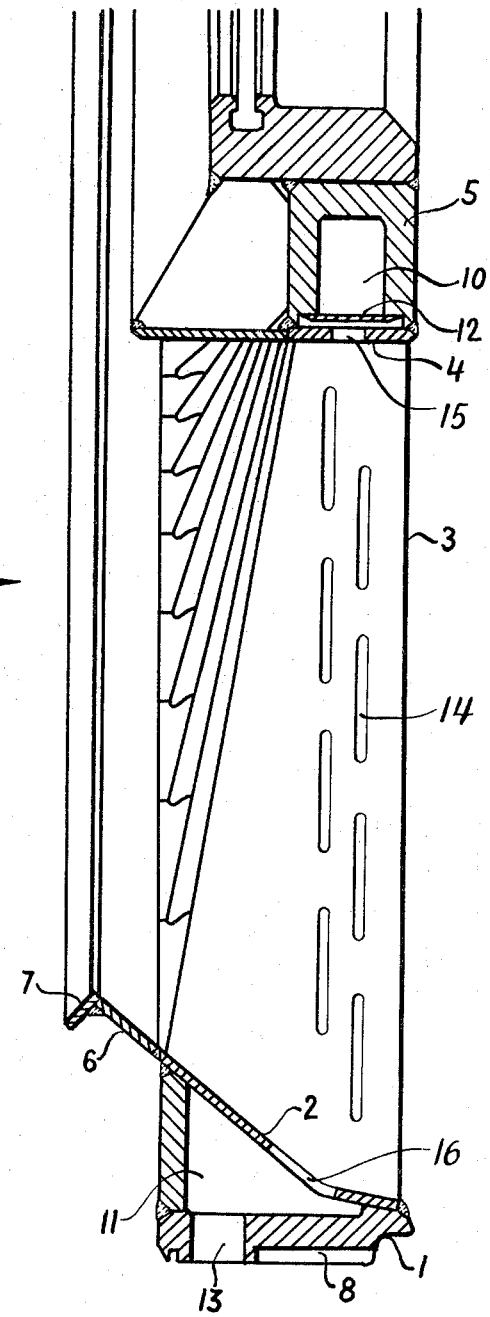
FIG. 2 illustrates the lower part of the guide wheel in axial section.
Figure 3:
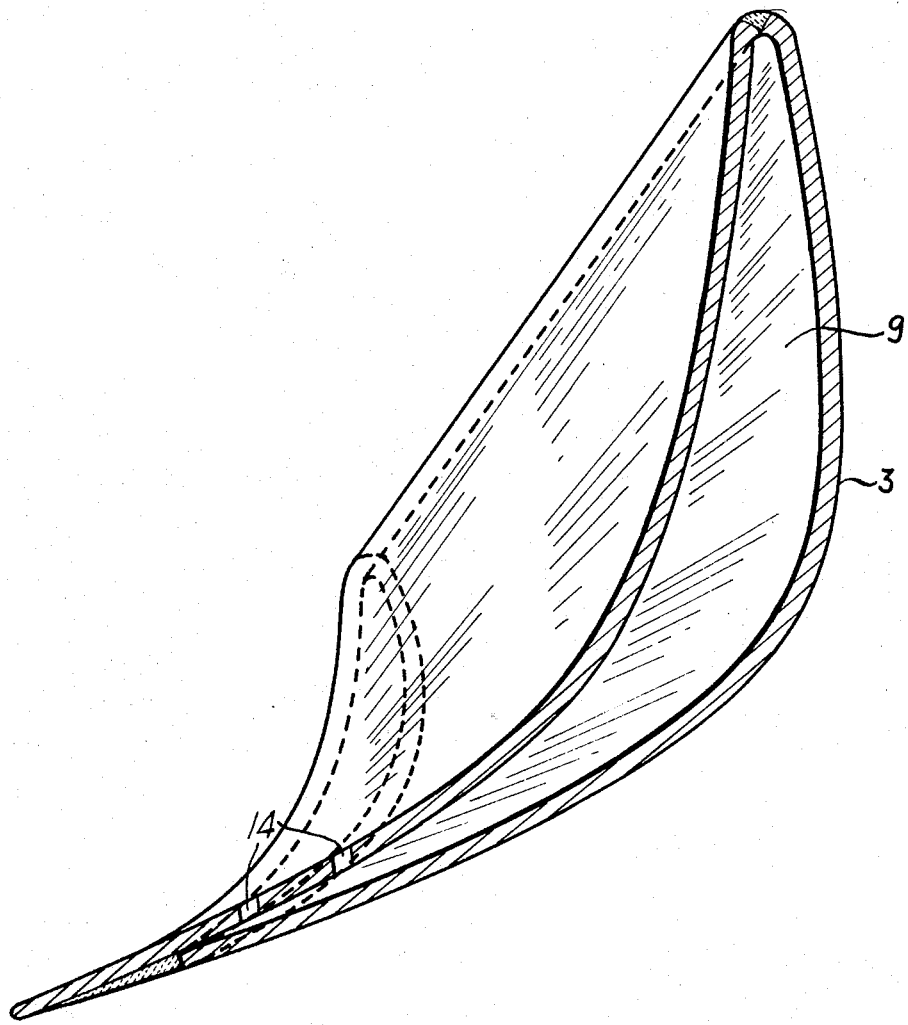

FIG. 3 is a sectional view of a hollow guide blade. The guide wheel of the illustrated turbine stage is of welded construction. It consists of the crown 1, the outer shrouding 2, the hollow welded guide blades 3, the inner shrouding 4, and the hub 5. To the outer shrouding 2 of the guide blades 3 is attached a sheet-metal ring 6 which forms, together with the second sheet metal ring 7 a peripheral passage for leading away the water spouted off the moving blades of the preceding stage. On crown 1 of the guide wheel is provided a groove 8 for a non-illustrated spring which secures the guide wheel against rotation within the turbine body. The water captured on the guide blade 3 is led away by a system of slots 14 into the hollow interior 9 of the guide blade 3, as indicated in FIG. 3. The water flows from the guide blades 3 of the upper part of the guide wheel through radial passages 15 in the shrouding 4 into an annular channel 10 in the hub 5; and from there through selected guide blades 3 of the bottom part of the guide wheel and radial apertures 16 in the shrouding 2 into a peripheral duct 11 in the crown 1 of the guide wheel into which also flows the water from the interior 9 of the remaining guide blades 3 of the bottom part of the guide wheel. Except for the afore-mentioned selected blades, the passages 15 through the inner shrouding 4 leading into the guide blades in the bottom part of the wheel from the channel 10 are blocked by a sheet metal band 12. An opening 13 in the lowest part of the crown 1 discharges the collected water to the non-illustrated condenser.

What I claim is:

In a stationary guide wheel for a turbine, in combination:

(a) a central hub having a horizontal axis and being formed with an annular channel therein;

(b) a peripheral crown radially spaced from said hub and coaxial therewith;

(c) an outer shrouding defining a duct with said crown, said shrouding being interposed between said crown and said hub;

(d) an inner shrouding contiguously adjacent said hub, said inner shrouding being interposed between said hub and said outer shrouding;

(e) a plurality of blades extending radially between said shroudings and being angularly spaced about said axis,
   (1) each blade having a hollow interior radially extending relative to said axis and an outer surface formed with openings therein communicating with said interior for leading water collecting on said surface into said interior,
   (2) a first group of said blades being located above said axis, and a second group of said blades being located below said axis,
   (3) said inner shrouding being formed with a plurality of passages respectively providing communication between the interiors of the blades of said first group and said channel, and between the interior of one blade of said second group and said channel,
   (4) said outer shrouding being formed with a plurality of apertures respectively providing communication between the interiors of the blades of said second group and said duct; and (f) means for discharging water by gravity from said duct.

References Cited by the Examiner
UNITED STATES PATENTS

| | | | |
|---|---|---|---|
| 1,311,811 | 7/1919 | Gough | 55—409 |
| 1,360,929 | 11/1920 | Gough | 55—409 |
| 1,829,674 | 10/1931 | Rosenlocher. | |
| 1,866,663 | 7/1932 | Morris | 55—457 |
| 2,431,336 | 11/1947 | Lincoln | 55—409 |
| 2,918,139 | 12/1959 | Silverman | 55—457 |

FOREIGN PATENTS 223,494   8/1959   Australia.

HARRY B. THORNTON, *Primary Examiner.*